Figure 1:
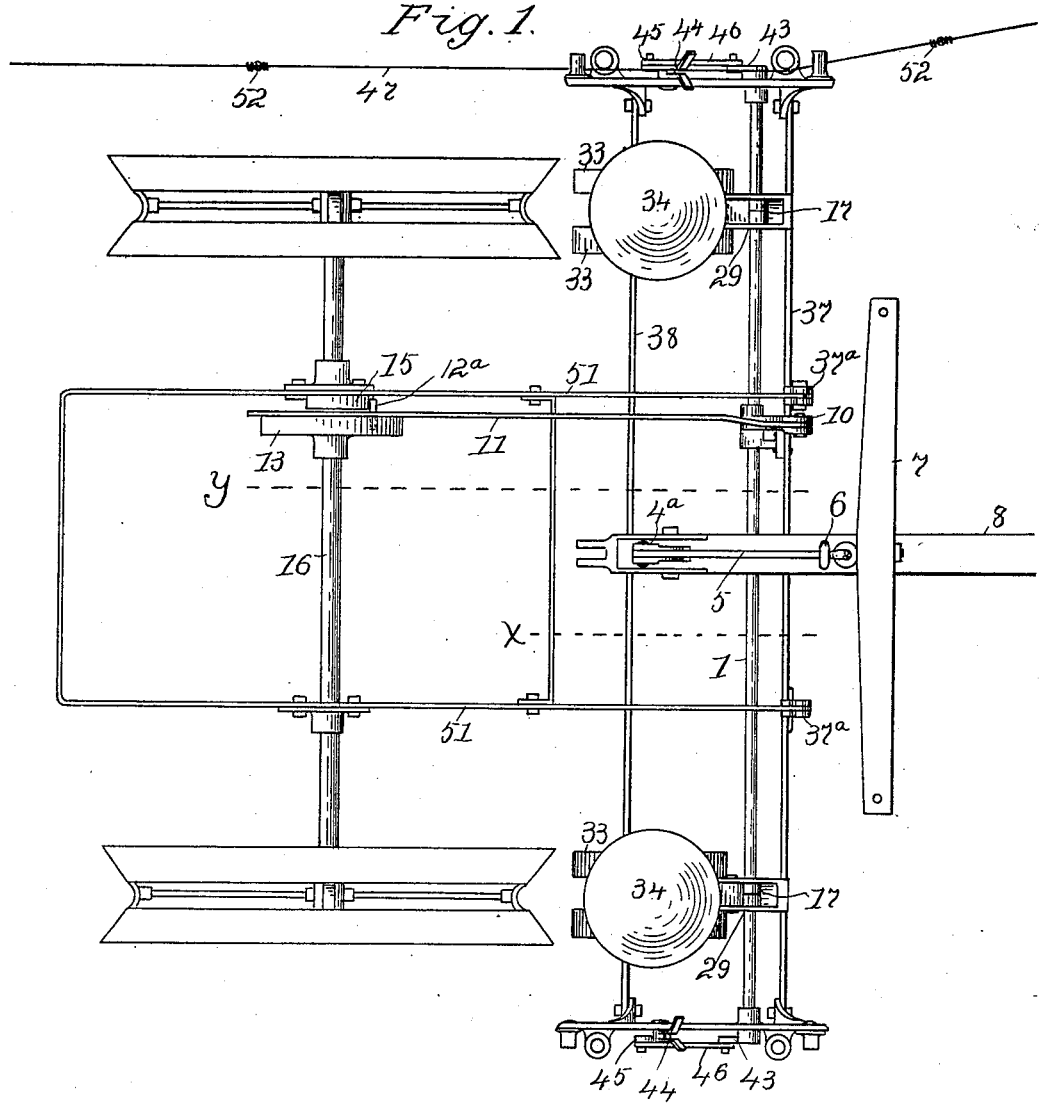

No. 680,326. Patented Aug. 13, 1901.
L. P. GRAHAM.
CORN PLANTER.
(Application filed June 12, 1900.)
(No Model.)
5 Sheets—Sheet 1.

Witnesses,
Nora Graham.
Ina Graham.

Inventor,
L. P. Graham

No. 680,326. Patented Aug. 13, 1901.
L. P. GRAHAM.
CORN PLANTER.
(Application filed June 12, 1900.)
(No Model.) 5 Sheets—Sheet 2.
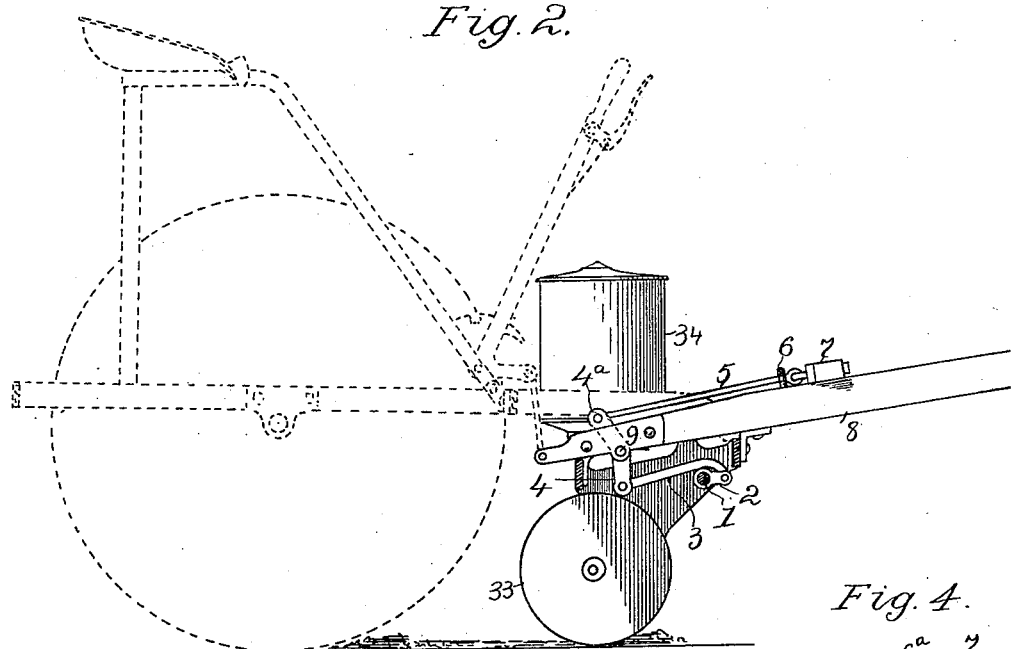
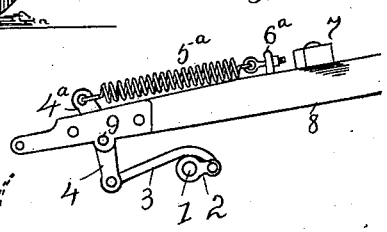
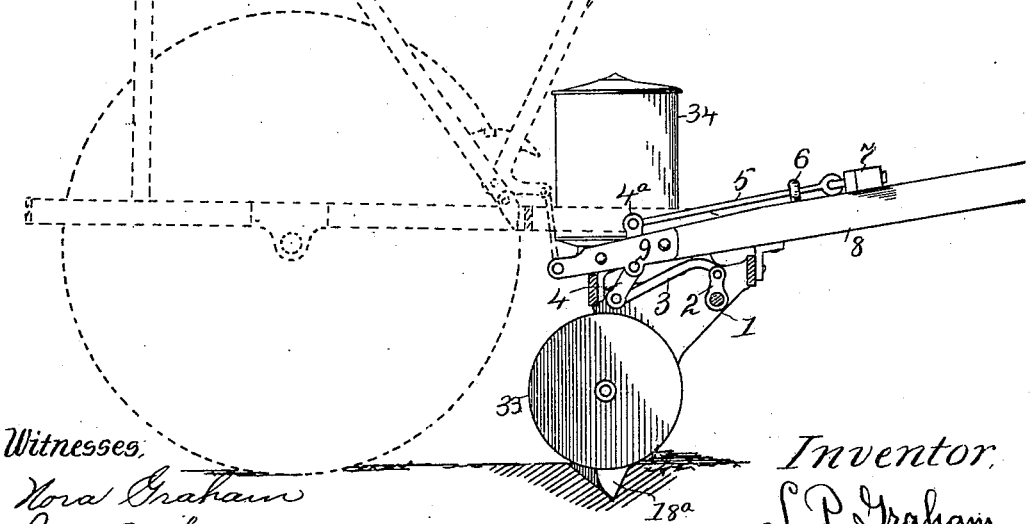
Witnesses,
Nora Graham
Ina Graham
Inventor,
L. P. Graham, No. 680,326. Patented Aug. 13, 1901.
L. P. GRAHAM.
CORN PLANTER.
(Application filed June 12, 1900.)
(No Model.) 5 Sheets—Sheet 3.
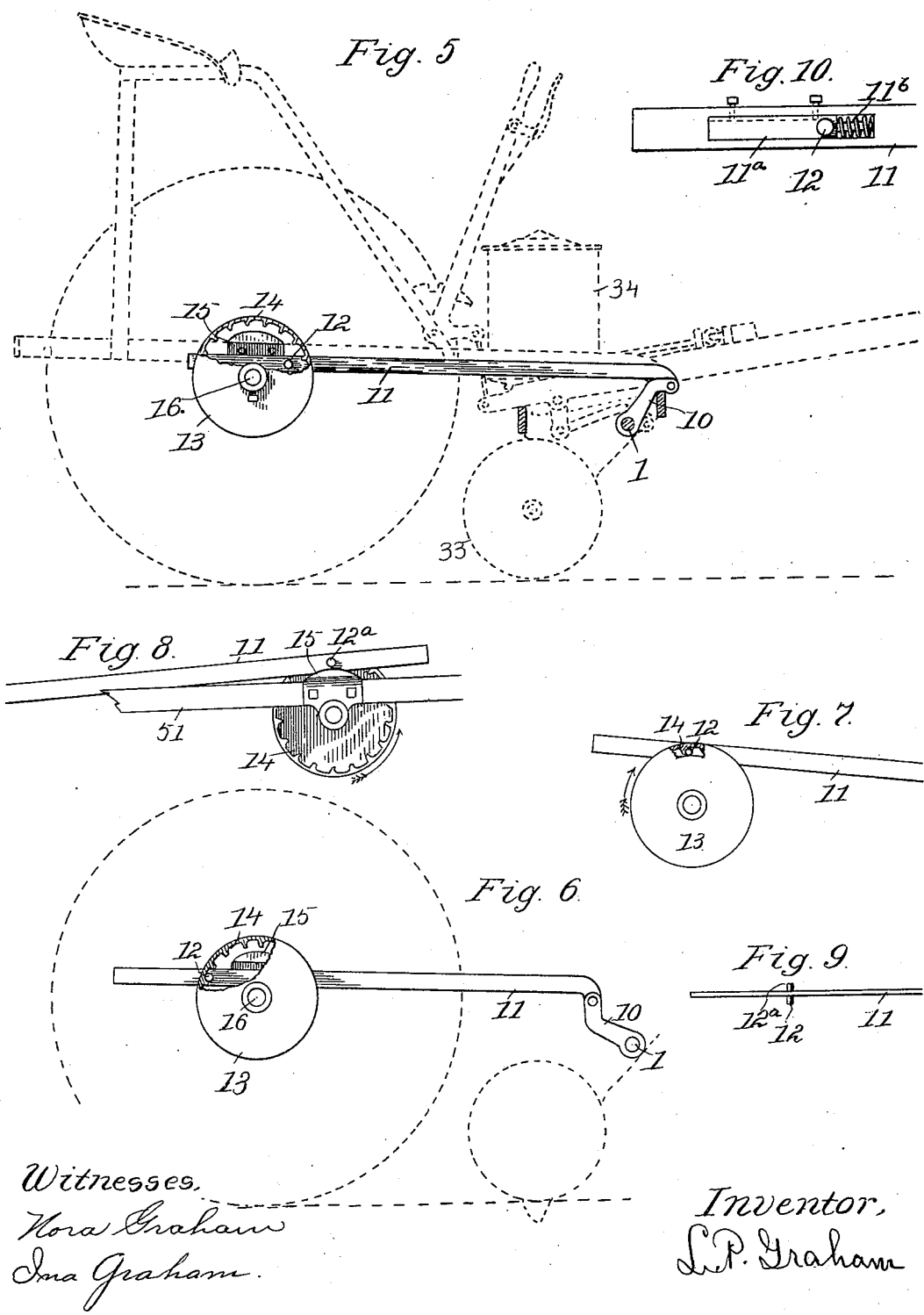

No. 680,326. Patented Aug. 13, 1901.
L. P. GRAHAM.
CORN PLANTER.
(Application filed June 12, 1900.)
(No Model.) 5 Sheets—Sheet 4.
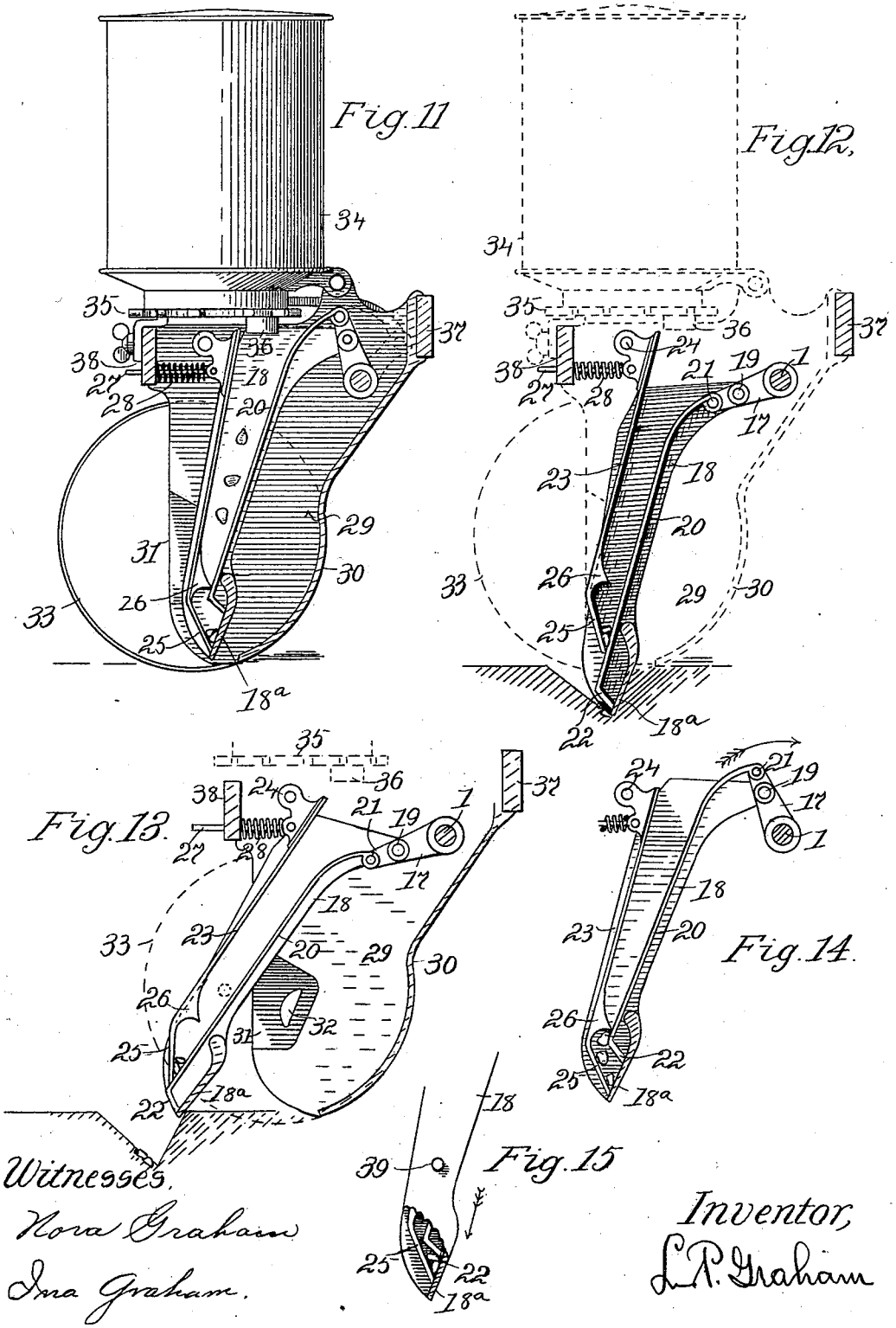

No. 680,326. Patented Aug. 13, 1901.
L. P. GRAHAM.
CORN PLANTER.
(Application filed June 12, 1900.)
(No Model.) 5 Sheets—Sheet 5.
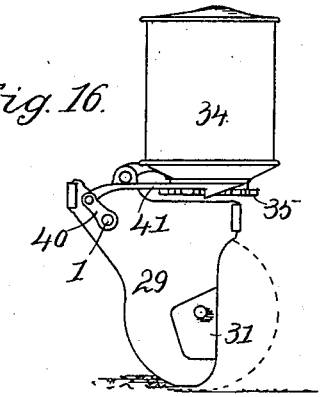
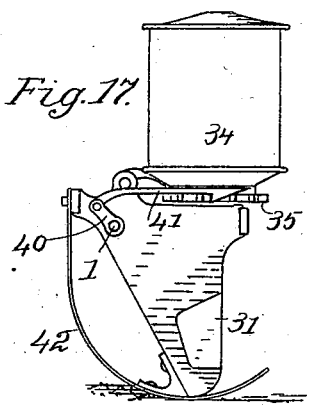
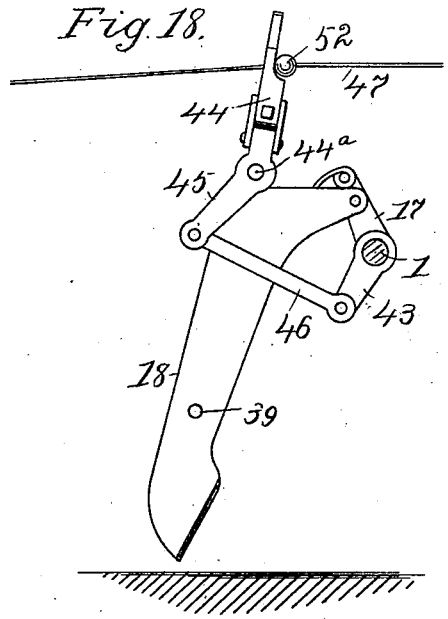
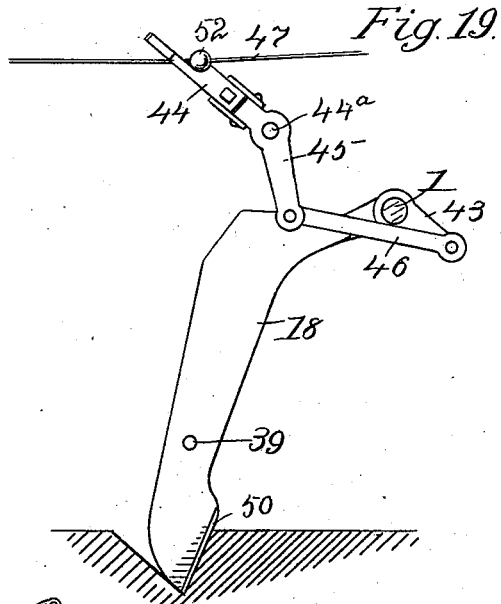
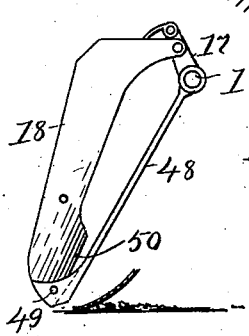
Witnesses.
Nora Graham
Ina Graham
Inventor
L. P. Graham

UNITED STATES PATENT OFFICE.

LEVI P. GRAHAM, OF DECATUR, ILLINOIS.

CORN-PLANTER.

SPECIFICATION forming part of Letters Patent No. 680,326, dated August 13, 1901.

Application filed June 12, 1900. Serial No. 20,030. (No model.)

*To all whom it may concern:*

Be it known that I, LEVI P. GRAHAM, of the city of Decatur, county of Macon, and State of Illinois, have invented a certain new and useful Corn-Planter, of which the following is a specification.

This invention relates to check-row planters; and it provides means for depositing the corn at intervals without cutting a continuous furrow. It is exemplified in the structure hereinafter described, and it is defined in the appended claims.

In the drawings forming part of this specification, Figure 1 is a plan of a planter embodying my improvements, the seat and lift-lever being omitted. Fig. 2 is a side elevation illustrating the preferred means for storing seed-depositing force and showing such force in the potential form. Fig. 3 is a side elevation of the mechanism shown in Fig. 2, representing the seed-depositing force applied. In Figs. 2 and 3 the front frame of the planter is cut on line $x$ in Fig. 1 and the rear frame is shown in broken lines. Fig. 4 is a detail of a modified embodiment of potential energy. Fig. 5 is a side elevation of the mechanism used to develop the potential seed-depositing force from the rotation of the planter-wheels, the frame being cut on line $y$ in Fig. 1 and a force-developing movement being shown completed. Fig. 6 also shows the mechanism used to convert the rotation of the planter-wheels into potential seed-depositing force, this view representing the beginning of a movement. Fig. 7 is a detail showing a force-storing movement partly completed. Fig. 8 is a like detail showing the opposite side of the mechanism. Fig. 9 is a detail in plan of an end of the force-transmitting bar. Fig. 10 is a detail in elevation of an end of the force-transmitting bar, showing a modified form thereof. Fig. 11 is a vertical section through the seed-depositing mechanism, showing the parts on a larger scale and representing the conditions that exist immediately preceding a planting operation. Fig. 12 is a similar representation showing a seed-depositing action. Fig. 13 illustrates the rearward swing of the seed-depositing prod, which occurs immediately after the seed is deposited and the purpose of which is to avoid impeding the forward travel of the planter. Fig. 14 is a detail showing how the seed for a hill is forced into the discharge end of the prod as the prod rises. Fig. 15 is a detail showing how the seed is forced under the end of the planting-plunger as the planting-prod descends. Fig. 16 is a side elevation showing the means used to operate the first drop or seed-measuring mechanism of the planter. Fig. 17 is an elevation showing a modified form of support for the front frame of the planter. Figs. 18 and 19 represent the action of the check-row wire on the planting mechanism, the two extreme positions of the forked lever being shown. Fig. 20 shows a prod-cleaning scraper that may be used on sticky ground.

The rear or wheel frame of the planter is shown at 51 in Fig. 1 and the axle for the rear wheels is shown at 16. The shaft is driven by one or both of the rear wheels, and its rotation is used to store force developed by the travel of the team in a form applicable to the seed-depositing prods. The front or runner frame may be made of any desired form, but in this instance it is composed of a pair of parallel bars 37 and 38, with the front one of which the rear frame 51 is pivotally connected. The check-row heads are fastened to the ends of the front frame, the tongue 8 is fastened to the center of the front frame, and the seed-hoppers 34 occupy their usual positions. The shaft 1 is journaled in the check-row heads and in the shanks 29, and it may be suitably sustained wherever severe stress exists. The shanks 29 or the casings that occupy the places of ordinary shanks are fastened to the bars 37 and 38, and they sustain the hoppers 34. They form casings for the seed-depositing prods, and their form may vary to any extent consistent with protection of the prods.

An arm 17 is fastened onto shaft 1 in each of the casings or shanks 29. On the end of the arm is pivoted a plunger 20, the pivot of which is shown at 21, and at 19 is pivoted a prod 18. The prod is composed of two side walls and a front wall 18ᵃ at its lower end. The plunger fits between the side walls, with its lower end resting against the front wall of the prod. The arm 17 extends rearwardly, so as to bring the upper end of the prod under the discharge 36 of the hopper, and the plunger forms the front wall of the seed-chute, the side walls of which are formed by the prod. The prod is pivoted nearer shaft 1 than is the plunger, and so the plunger travels farther than the prod when the arm is rocked. The rear wall of the seed-chute is formed by a valve 23, which is pivoted in the shank at 24 in the rear of the discharge 36 of the seedbox. The lower end 25 of valve 23 is turned forward to bear against the lower end of wall 18$^a$, when the prod is raised, and forms a retaining-receptacle for the corn, and an inclined shelf or projection 26 extends forward from the valve in contact or approximate contact with the rear surface of the lower end of the plunger when the prod is raised. The valve is held against the prod and the plunger by spring-pressure, and a convenient way of providing such pressure is to extend a rod 27 from the valve 23 through a hole in bar 38 and place a compression-spring 28 on the rod between the bar and the valve. The prod has a stud 39 on one of its sides, or it may have one on each side, and the shank is recessed at 31 to provide a path of travel for the stud. A cam 32 (shown only in Fig. 13) coacts with the stud on the prod to control the downward movement of the prod.

The weight of the prod and the plunger is well to the rear of their pivotal connection with arm 17, and so the tendency of the lower end of the prod is to swing forward. This tendency is augmented by the action of spring 28, and so whenever the prod is raised the stud 39 will rest in the forward upper corner of recess 31, above and in front of the front wall of cam 32. The lower end of the prod is carried above the ground some little distance, as shown in Fig. 11, and downward motion of the prod in the act of planting will carry the stud in front of the cam before the lower end of the prod engages the ground. After the stud engages the cam the prod has no choice but to follow the inclination of the cam and deposit the seed, as shown in Fig. 12; but as the seed is deposited the stud passes the lower end of the cam and the prod swings freely backward as the planter travels on, as shown in Fig. 13.

In traveling from one cross-row to another the prod is raised to the position shown in Fig. 11, the disk-wheel of the seedbox is moved to discharge a hill of corn into the prod, and the prod comes to rest with one hill of corn held in its lower end by the forward-turned end 25 of valve 23 and another hill in transit down the chute. The lower end of the plunger is above the corn in the lower end of the prod, and as the prod again descends when another cross-row is reached the spring-actuated valve presses the corn close under the plunger preparatory to the depositing thrust thereof. (See Fig. 15.) As the plunger passes the lower end of the valve the extension 26 is forced from grain-impeding cooperation with the plunger and the detained grain falls against the lower end 25 of the valve, as shown in Figs. 12 and 13. As the prod is again raised the lower end of the valve slides around the lower end of the plunger, thereby removing any soil that may chance to adhere to the plunger, and as the raising movement is completed the extension 26 again comes in contact with the plunger, forcing the grain into the discharging-receptacle, as shown in Fig. 14, and forming an intermediate detainer for the grain discharging from the seedbox.

The shaft 1 is rocked intermittently to deposit the corn into the ground and raise the prods preparatory to a repetition of the depositing operation. The shaft is rocked forward and the prods are raised by forward travel of the team, force being imparted from the wheel-shaft 16 to the rock-shaft and means being provided to hold the prods in a raised position until they are released by a knot on a check-row wire or other outside means. As the prods are raised potential energy is stored to be used in forcing the prods into the ground, and this energy is in this instance used in connection with the force developed by the resistance of the knots on a check-row wire. The potential energy may be represented by gravity, tending to draw down the raised prods, or it may be represented by a spring under tension, as shown in Fig. 4; but I prefer to employ the energy that may be acquired by temporarily diverting the forward pull of the team on the planter to downward pull on the prods. In doing this the travel of the planter must be hastened between cross-rows to compensate for the slight slowing up of the planter at the time of planting, and in the position gained by this accelerated motion the potential energy resides.

In Figs. 2 and 3 the doubletree 7 is shown connected pivotally with a hitch-rod 5, which connects pivotally at its rear end with the upper end 4$^a$ of a lever 4. The lever 4 is fulcrumed at 9 in tongue 8 and its lower end connects through bent link 3 with an arm 2 on shaft 1. In the position shown in Fig. 2 the arm 2 is thrown forward until its swinging end is slightly beyond a line drawn from the lower end of lever 3 through the center of shaft 1, and so a dead-center lock is formed. Under these conditions the team pulls the planter forward the same as if lever 4 were rigid with the tongue and the pull has no tendency to rock shaft 1; but whenever the swinging end of arm 2 is raised above a dead-center the pull of the team is in great part transferred from a forward pull on the planter to a rocking pull on shaft 1 and the arm 2 is moved to the position shown in Fig. 3. This forces the prods into the ground and leaves the team-hitch advanced somewhat with relation to the tongue, as the team travels faster than the planter while applying force to the prods. The next move in the operation is to raise the prods and to hasten the travel of the planter, so as to bring bearing 6 as close as possible to the doubletree, and this is effected by the mechanism shown in Figs. 5 to 10. In these figures, 13 designates a wheel which is fastened onto axle 16, and has internal teeth 14. A bar 11 is pivotally connected at its front end with an arm 10, which is fastened to shaft 1, and the rear end of the bar rests on the axle 16, adjacent to the recessed face. The bar has a pin extending through its rear part and forming studs 12 and 12$^a$ on opposite sides of the bar. One of the studs 12 extends into the face of the wheel and a cam 15 is fastened to the planter-frame in position to form a bearing for stud 12$^a$ as the wheel 13 acts to rock arm 10. The cam 15 is concentric with the wheel and it describes an arc of a circle approximating the length of the throw of bar 11.

When the prods are in the ground, the stud 12 is against the rear wall of wheel 13 and in engagement with a tooth thereof. The forward rotation of axle 16 raises the rear end of the bar 11 until stud 12$^a$ is above cam 15, and further movement of the wheel carries the bar and the arm 10 to the position shown in Fig. 5. When this position is reached, the dead-center lock shown in Fig. 2 is established and maintained by the pull of the team, and as soon as the stud 12$^a$ passes from contact with the cam the bar will fall onto axle 16, preparatory to a repetition of the dropping operation. The stud 12 cannot get from operative contact with the tooth of the wheel so long as stud 12$^a$ rides on the cam and the cam is of proper length to compel a completion of the prod-raising and force-storing action of shaft 1. When the arm 10 is in the position shown in Fig. 5, the pivot of bar 11 with said arm 10 is in line with the hinge of the two frames of the planter, (see Fig. 1, where the planter-hinge is represented at 37$^a$,) and so the forward thrust of the bar 11 will always precisely complete its operation, no matter how the front frame may be tilted with relation to the rear frame. The front frame rocks in its rise and fall with the neck-yoke of the team for a pivotal center, while the rear frame rocks with axle 16 for a pivotal center; but by having the end of arm 10 in line with the hinge of the frames such independent rocking action is neutralized. In order to avoid possibility of stud 12 striking fair against the nose of a tooth and obstructing the operation of the wheel 13, the studs may be formed on a slide having movement in bar 11 equal to the depth of a tooth, and a spring-buffer may be introduced to yieldingly take the shock. In Fig. 10 such a slide is shown at 11$^a$ and a buffer at 11$^b$.

In Figs. 18 and 19 a forked lever is shown at 44, the pivot thereof at 44$^a$, and an extension thereon at 45. At 43 is shown an arm fixed on shaft 1, and a stiff link 46 connects extension 45 with arm 43. When a knot 52 on a check-row line 47 engages the forked lever, as shown in Fig. 18, the lever is thrown backward by forward travel of the team, the motion of the lever is imparted to the rock-shaft through link 46 and arm 43, and by the time the lever has reached the position shown in Fig. 19 the prods have deposited the corn in precise alinement with the knot. The prod-raising mechanism and the forked levers constitute effective means for actuating the prods and depositing the corn, as the knots on the check-row wire will furnish sufficient resistance to force the prods into ordinary soil; but on account of side pull on the planter and the jerk that results from throwing substantially all the work onto the planter at certain points in its travel it is preferred to store energy in traveling from one cross-row to another to be used during the more severe operation of forcing the prods into the ground.

With means for forcing the prods into the ground (shown in Fig. 5) the check-row wire does but little more than raise arm 2 above the dead-center line, although it will act with the prods to retard the planter when necessary. As the prods enter the ground they are held from backward swing by the cams 32, (shown in Fig. 13,) and they tend to form a short furrow as they descend. This tendency, coupled with the resistance of the knots on the check-row wire, acts to destroy the momentum of the planter, and the team, relieved of the task of drawing the planter, pulls on arm 2 and forces the prods into the ground. As soon as the planting is completed the prods swing freely backward and the wheel 13 begins its task of adding a little to the comparatively light burden of drawing the planter from one cross-row to another, so that the more severe stress of planting may be relieved. The planter-wheels travel about thirty inches in raising the prods and storing potential energy, while the plungers travel about three inches forward in penetrating the ground. So it is seen that the storage of penetrating force through a thirty-inch movement requires but one-tenth the pull that would be required to force the plungers into the ground during their three-inch forward travel. It is a leverage of ten to one in favor of storing the penetrating force while traveling between cross-rows.

In Fig. 4 a spring 5$^a$, hitched to the tongue at 6$^a$ and connected with lever 4, represents potential energy stored by travel of the planter; but this form is inferior to that shown in Figs. 2 and 3, for the reason that the spring becomes weaker as it nears its normal state, while the resistance of the prods becomes greater as the spring grows weaker. The shanks or casings 29 have a front wall 30, which protects the prods, and they are preferably provided with wheels 33, which sustain the weight of the front frame to any desired extent. These wheels may be made of various widths of face, so as to penetrate the ground more or less deeply, and they may be made of different diameters, so as to raise the prods different distances from the soil. The prods are made to penetrate the soil the maximum depth when their ends are carried close to the ground, and when they are raised higher they will plant shallower. In Fig. 17 a shoe 42 is shown as a substitute for the wheels 33.

The first drop of the planter is operated through a toothed wheel 35, which carries the seed-plate, and a pawl 41, which connects with arm 40 on shaft 1. (See Fig. 16.) The seed-plate is actuated as the prods rise.

In Fig. 20 a scraper-bar 48 is shown connected pivotally with shaft 1 and slidably with the front wall of the prod. The prod has side ledges 50, which are engaged by pins 49 in the wings of the scraper. The scraper partakes of the swing of the prod, but not of its up-and-down movement.

With the check-row movement proportioned as shown in Figs. 18 and 19 the prod travels forward three inches while penetrating the ground two inches, and a triangular depression is made with an area of three square inches in longitudinal vertical section. A runner opens a continuous furrow from one cross-row to another, a distance of about forty-two inches, and when the furrow is two inches deep the area of a longitudinal vertical section of the depression made to receive a single hill of corn is eighty-four inches, or twenty-eight times as great as is needed. The front frame travels on the ground, the prods are always a certain height above the ground when raised, the plunging motion of the prods is always the same, and so the grain is deposited at a uniform depth.

The prods 18 are seed-chutes in the sense that they convey the seed to the ground, and they are furrow-formers in the sense that they travel with the planter while entering the ground and displace soil after the manner of a runner.

I claim—

1. In a planter, the combination of a seed-plunging prod, or prods, and a planter-pulling hitch connected with the prods and having a limited movement lengthwise of the planter, whereby the movement of the hitch with relation to the planter may be used to plunge the prods.

2. In a planter, the combination of a seed-plunging prod, or prods, a planter-pulling hitch connected with the prods and having a limited movement lengthwise of the planter, and a check-row appliance adapted to transfer the pull of the team from the planter to the prods.

3. In a planter, the combination of a rock-shaft, a seed-plunging prod, or prods, actuated from the rock-shaft, a planter-pulling hitch connected with an arm on the rock-shaft and normally forming a dead-center lock with the arm, and a check-row appliance to rock the shaft and break the lock.

4. In a planter, the combination of a rock-shaft, seed-plunging prods actuated from the rock-shaft, an arm on the lever normally presented forward, a lever fulcrumed in the rear of the shaft, a link from one end of the lever connecting with the arm and normally forming therewith a dead-center lock, a team-hitch connected with the other end of the lever and means for rocking the shaft to break the lock.

5. In a planter, the combination of a seed-plunging prod, or prods, a planter-pulling hitch connected with the prods and having a limited movement lengthwise of the planter, a check-row appliance to convert the forward pull on the planter into downward push on the prods, and prod-raising mechanism actuated by the travel of the planter.

6. In a planter, the combination of a shaft, a seed-plunging prod, or prods, actuated from the shaft, an arm on the shaft, a prod-plunging appliance normally applying potential stress ineffectively in the direction of the length of the arm and means for turning the arm so as to make the stress effective.

7. In a planter, the combination of a seed-plunging prod, or prods, planter-driven mechanism for raising the prods and storing plunging force, a dead-center lock to hold the plunging force, and means for breaking the dead-center lock.

8. In a planter, the combination with the planting mechanism thereof, of an internally-toothed wheel driven by the travel of the planter, and a bar connecting at one end with the planting mechanism and having a stud at the other end to engage the teeth of the wheel.

9. In prod-raising mechanism for plunger-planters, the combination of an internally-toothed wheel fixed on the planter-axle, a prod-raising bar having a stud to engage the teeth of the wheel, and a cam attached to the planter-frame to carry the stud of the bar in contact with a tooth of the wheel while the bar is raising the prods.

10. In a planter the combination of a front frame, a rear frame hinged to the front frame to permit independent vertical swing in the frames, a rock-shaft in the front frame through which the planting mechanism is actuated, a push-bar operated from the rear wheels to rock the shaft in one direction and an arm on the rock-shaft with which the push-bar is pivotally connected, the pivotal connection of the push-bar with the arm being approximately in alinement with the hinge of the planter when the bar is pushed forward.

11. In a plunger-planter the combination of a vertically-swinging rock-arm, a seed-depositing prod pivotally connecting with the rock-arm and means for holding the lower end of the prod against backward swing during its seed-depositing operation.

12. In a plunger-planter, the combination of a shank or casing, a vertically-swinging rock-arm, a seed-depositing prod in the shank or casing, a cam on a side of the casing and a stud on the prod to bear against the cam during the seed-depositing operation and control the prod against backward swing.

13. In a plunger-planter, the combination of a rock-arm, a hollow prod pivotally connected with the arm, a plunger in the prod pivoted to the arm beyond the pivot of the prod and a rear valve for the prod pivoted to the planter independent of the prod.

14. In a plunger-planter, the combination of a rock-arm, a hollow prod pivoted to the arm, a plunger in the prod pivoted to the arm beyond the pivot of the prod, a rear valve for the prod pivoted in the planter-frame independendent of the prod with its lower end normally closing the prod below the plunger, and an inward shelf or extension on the valve normally bearing against the plunger.

15. In a plunger-planter, the combination of a rock-arm, a hollow prod pivotally connected with the arm, a plunger pivoted to the arm beyond the pivot of the prod, a rear valve for the prod pivoted to the planter independent of the prod, and a spring holding the lower end of the valve against the prod and the plunger therein.

16. In a plunger-planter, the combination of a seedbox, a rock-arm under the box, and a hollow seed-depositing prod pivoted to the arm with its upper end normally presented to the discharge-opening of the seedbox.

17. In a plunger-planter, the combination with seed-depositing prods, of shanks, or casings, in which the prods operate and rolling supports for the shanks.

18. The combination with a seed-depositing prod moving downward and upward and also swinging backward and forward, of a prod-cleaning scraper partaking of the swing of the prod and held against up-and-down motion.

19. In a plunger-planter, the combination of a rock-arm, a seed-depositing prod pivoted on the rock-arm, and a scraper-bar slidably connected with the prod at its scraper end and pivoted at its upper end near the pivot of the rock-arm.

20. In a planter, the combination with the seed-dropping mechanism thereof, of an appliance for storing potential energy, a rock-arm to impart the stored energy to the seed-dropping mechanism, such arm receiving the stress of the potential-energy appliance in the direction of its length during rest intervals, and means for rocking the arm to apply the potential energy.

21. In a planter the combination with a seedbox, of a seed-chute pivoted at its upper end under the discharge-opening of the seedbox, a valve to close the lower end of the chute and a seed-expelling plunger pivoted under the seedbox and extended into the chute.

22. In a planter, the combination with a seedbox, of a seed-chute pivoted under the discharge-opening of the seedbox, a valve for the seed-chute, an arm pivoted outside the chute and extended into the upper end thereof, and a seed-depositing plunger in the chute pivotally connected with the arm.

23. In a planter, the combination with a seedbox, of a seed-chute pivoted at its upper end under the discharge-opening of the seedbox so that its lower end may swing backward and forward, a valve to close the lower end of the chute, a rock-arm under the seedbox to return the chute to a seed-receiving position after a planting operation and a seed-discharging plunger in the chute connected pivotally with the arm.

24. In a planter, the combination of an intermittently-acting furrow-former and a seed-expeller in the furrow-former adapted to expel the seed forcibly as the furrow is formed.

25. In a planter, the combination of a front frame supported on the soil, an intermittently-acting furrow-former protrudable below the support of the frame and a seed-expeller in the furrow-former acting forcibly on the seed concurrently with the protrusion of the furrow-former.

In testimony whereof I sign my name in the presence of two subscribing witnesses.

LEVI P. GRAHAM.

Witnesses:
NORA GRAHAM,
INA GRAHAM.